United States Patent Office 3,218,810
Patented Nov. 23, 1965

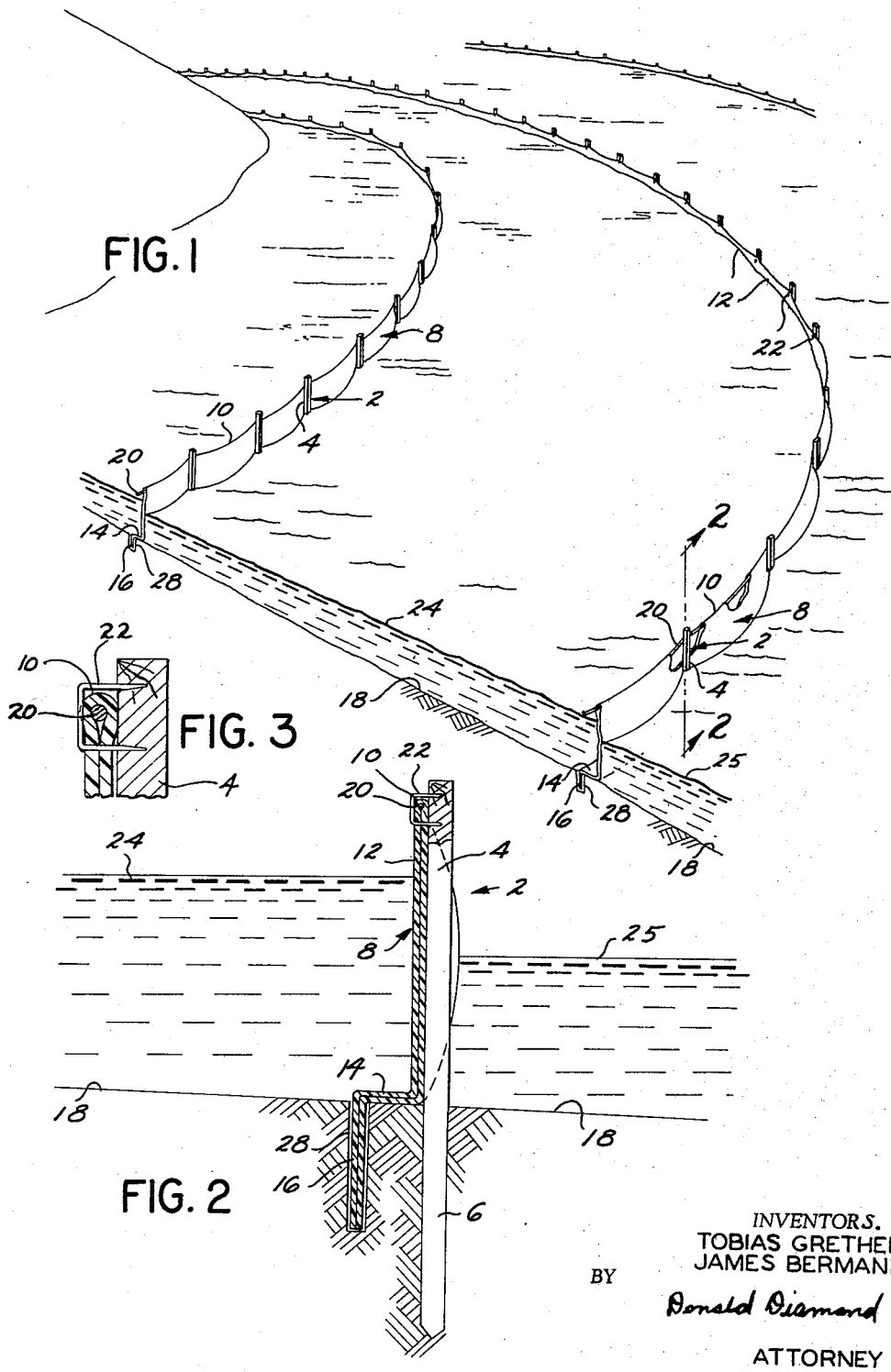

3,218,810
SYNTHETIC LEVEE
Tobias Grether and James Bermann, Camarillo, Calif., assignors to Consolidated Thermoplastics Company, Los Angeles, Calif., a corporation of Delaware
Filed Sept. 5, 1961, Ser. No. 135,951
7 Claims. (Cl. 61—12)

This invention relates to synthetic levees and to a method for preparing such levees.

Levees such as earth levees are employed in establishing ponds for growing rice since the rice plant, in contrast to most havested plants, is grown with the roots and the lower part of the leaves and stems submerged below the water surface during most of its growing season. Water is held on the rice field by a system of earth levees which are usually constructed on contour lines, i.e. lines of equal elevation, and by an earth levee, generally three to four feet in elevation, extending around the perimeter of the rice field. The system of earth levees within the perimeter of the rice field divide the field into compartments or checks, which vary in size according to the slope of the land. There is normally a difference of two or three-tenths of a foot in elevation between checks.

The earth levees defining the compartments or checks are generally constructed with a heavy diker that is shaped like a V. The V-type diker, or soil crowder, is 14 to 16 feed wide in front and 4 feet wide at the discharge end. The diker, drawn by two or more crawler tractors, draws in loose soil and releases it through the narrow end of the V to leave a levee or ridge of soil that may be as high as 2 or 3 feet and as wide as 5 to 7 feet at its base. After the levee settles, however, the height thereof will be from 16 to 20 inches above grade. To close the system for holding water, the ends of the levees crossing and dividing the field are joined to the levee that serves as the outside border.

The principal disadvantages of employing earth levees as checks in rice fields are (1) reduction in acreage usable for rice production, and (2) such levees establish non-rectangular fields which are difficult to harvest and work. Another disadvantage of using earth levees is that such levees present a breeding place for weed growth and weed seed production. Also, animal pests such as muskrats, field mice, Norway rats and crayfish tend to inhabit the contour levees and their burrowings frequently result in levee breaks with the consequent loss of water control.

It has been suggested that these disadvantages can be overcome by using plastic sheeting to form a synthetic rice levee. See, for example, University of California, Division of Agricultural Sciences, Leaf. 131, dated December 1960 by D. C. Finfrock et al., entitled "Water Management in Rice Production" and an article entitled "Plastic Levees Proved Possible in Yuba Rice," appearing in the April 1, 1961 issue of California Farmer at page 366.

As pointed out in the California Farmer, a test synthetic levee was prepared by plowing a furrow along a contour line and placing stakes upright in the furrow. Black polyethylene film of six mil thickness was rolled out alongside the stakes, pulled tight and stapled to the stakes. The lower portion of the plastic film disposed within the furrow was back filled with dirt to hold it in place.

This synthetic levee functions effectively as a rice dike when the difference in height of the water on adjacent sides of the levee is minimal, i.e. when the difference in the height of the water on adjacent sides of the levee is from about two-tenths to three-tenths of a foot. However, atmospheric conditions are often encountered in the rice field in which the forces exerted by the wind cause the water to accumulate and be at a maximum height adjacent to the levee on the uphill side and to be at a minimum height adjacent to such levee on the downhill side. It has been observed, in test operations, that under such conditions there is a failure of the plastic film at the locus of attachment on the stakes together with extensive billowing of the plastic film between stakes resulting in a substantial loss of freeboard with the consequent overflow of water into the adjacent pond. The principal defect of this synthetic levee, however, is the tearing and severing of the plastic film at the locus of attachment on the stake due to the force being exerted against the plastic film by the accumulation of water on the uphill side of the levee and the minimization of water adjacent to the levee on the downhill side. It would, nevertheless, be advantageous to use synthetic levees in rice fields since the use of such levees substantially increases the acreage which can be cultivated and minimizes the weed control problem.

Therefore, an object of this invention is to provide a synthetic levee adapted to withstand the force exerted by a fluid pressing against such levee.

Another object of this invention is to provide a synthetic levee adapted with means for absorbing and dissipating the force exerted by a fluid pressing against such levee.

A further object of this invention is to provide a synthetic levee which undergoes minimum freeboard displacement in the presence of a fluid exerting a force against such levee.

A still further object of this invention is to provide a synthetic levee which utilizes a substantially fluid-impervious, flexible member folded longitudinally into two side portions as the fluid barrier.

Yet, another object of the invention is to provide a synthetic levee which utilizes a substantially fluid-impervious, flexible member folded longitudinally into two side portions as the fluid barrier and which utilizes a linear member longitudinally disposed within the crease formed at the fold of the flexible member as a force absorbing and force dissipating member.

A still further object of this invention is to provide a method for preparing a synthetic levee adapted to withstand the force exerted by a fluid pressing against such levee.

Other objects will be apparent as this specification proceeds.

In accordance with one aspect of this invention, there is provided a soil supported synthetic levee which comprises, in combination, a plurality of uprights with a portion of each upright disposed within and supported by the soil, a substantially fluid-impervious, flexible member folded longitudinally into two side portions to form a crease, a linear support member longitudinally disposed within the crease and attached to each upright at a spaced locus above the soil and means engaging the lower edges of the side portions of the fluid-impervious member for maintaining the fluid-impervious member in fluid sealing relationship with the soil whereby a fluid barrier is established. It is apparent, of course, that the synthetic levee can be endless with a regular or irregular linear pattern. On the other hand, the synthetic levee can be disposed between two fluid barriers with its ends in fluid sealing relationship with such barriers.

In accordance with a second aspect of this invention, there is provided a method for preparing a soil supported synthetic levee which comprises inserting a plurality of uprights partially into the soil in a predetermined pattern, inserting a linear support member longitudinally into the crease formed at the fold of a substantially fluid-impervious, flexible member folded longitudinally into two side portions, attaching the linear support member to each upright at a spaced locus above the soil and sealing the lower edges of the side portions of the fluid-impervious member in the fluid sealing relationship with the soil whereby a fluid barrier is established.

Other features and advantages of the invention will appear from the following description taken in conjunction with the drawing, wherein;

FIG. 1 is a perspective view of a plurality of synthetic levees in a rice field with the fluid-impervious, flexible member cut away to show a section through adjacent ponds and to show the relationship of the linear support member to the folded, fluid-impervious member.

FIG. 2 is a transverse section taken along the lines 2—2 of FIG. 1.

FIG. 3 is an enlarged fragmentary view of the synthetic levee at the locus of attachment of the fluid-impervious member to the stake.

Referring more particularly to the drawing, a plurality of uprights 2 or rigid support members are partially disposed within the soil 18. The upright is preferably a wooden stake having a lower portion 6 depending into the soil and an upper portion 4 extending above the soil, and are spaced apart at substantially uniform intervals. The uprights are aligned in a predetermined linear pattern. The linear pattern can define a regular or irregular endless configuration or the linear pattern can extend from one fluid barrier to a second fluid barrier. The latter situation is encountered in rice fields wherein the linear pattern of the uprights is in spaced relationship to a contour line which traverses the rice field and terminates at each end at the outer peripheral levee. Although wooden stakes are preferred as uprights, it is apparent, of course, that metal or plastic supports are also suitable as uprights.

A substantially fluid-impervious, flexible member 8 folded longitudinally into two side portions in order to form a crease 10 and having a linear support member 20 longitudinally disposed within the crease is attached about the crease to each upright 2 at a spaced locus above the soil.

The fluid-impervious member is preferably rectangularly shaped and folded longitudinally into two uniform side portions. Polyethylene film is advantageously employed as the fluid-impervious, flexible member. Although polyethylene film is available in varying thicknesses, we have found that such film having a thickness of about two mils and folded into two side portions to provide a total thickness of about four mils is very effective as a fluid barrier in the synthetic levee of the invention. Other materials which can be used in fabricating the fluid-impervious member include, for example, polypropylene, waterproof paper, fiberglass and rubber.

A flexible, linear support member 20 is longitudinally disposed within the crease 10 formed at the fold of the polyethylene film. The linear support member can be twine, wire or synthetic woven material. 300 pounds test baler twine is particularly effective as a linear support member.

The folded polyethylene film with the linear support member longitudinally disposed within the crease is attached about the crease to each upright at a spaced locus above the soil. Although any means of attachment can be used, a staple 22 overlying the crease of the plastic film with the staple legs imbedded in the upright is very effective for this purpose.

The folded plastic film 8 has an upper portion 12, an intermediate section 14 and an end section 16. The upper portion of the folded film extends from the locus of attachment on the stake to the soil adjacent to the stake and merges into the intermediate section 14 which overlies a portion of the soil adjacent to the stake. The intermediate section terminates in an end section 16 which is disposed within the soil in fluid sealing relationship therewith. In a preferred embodiment, the plastic film end section is disposed within a channel cut in the soil in substantially uniform spaced relationship to the stakes and soil is compacted about the end section to form a fluid seal at the junction of the film and the soil. Also, it is advantageous to perforate the plastic film intermediate section overlying the soil with small openings in order that water can pass therethrough to disperse large clumps of clay which otherwise might puncture the intermediate section as the rice paddy is being filled with water.

The synthetic levee of the invention is particularly advantageous because it enables the rice agronomist to use plastic film as the fluid barrier in establishing rice ponds without the film failing at the locus of attachment to the stakes under atmospheric conditions causing an accumulation of water adjacent to the film on the uphill side of the levee and a minimization of water adjacent to the film on the downhill side of the levee. In addition, the synthetic levee of the invention undergoes minimum loss of freeboard under windy conditions causing an accumulation of water adjacent to the film on the uphill side of the field and, thus, spill-over of water into the adjacent pond is prevented or minimized.

The synthetic levee of the invention, particularly adapted for use as a rice dike, can be prepared by cutting a thin channel 28 within the soil along a contour line which traverses the rice field and terminates at each end at the peripheral levee which forms the border of the rice field. A channel about 1½ inches wide and about 9 inches deep is satisfactory to accommodate the end section 16 of the plastic film. Although the channel can be cut by hand, a subsoiler mechanism attached to a tractor can also be used for preparing the channel.

A plurality of 30-inch stakes 2 are driven about 14 inches into the soil along a line which is in substantially uniform spaced relationship to the channel. The stakes are inserted into the soil on the downhill side of the field with respect to the location of the channel and are spaced about 4 feet apart with each stake being about 4 inches from the near edge of the channel. The stakes can be inserted into the soil by manual means or an automatic staking mechanism attached to a tractor. For most efficient operation, the staking mechanism should be adapted to insert the stakes vertically into the soil as the tractor is moving forward.

A roll of lay-flat polyethylene tubing having a 30-inch width and split along one edge provides a suitable source for the folded flexible film. As the folded film 8 is unwound, 300 pound test baler twine 20 is longitudinally disposed within the crease 10 formed at the fold of the film. A tube terminating at its upper edge in an elbow and disposed vertically between the sides of the film with the elbow extending in the direction of unwinding provides a suitable mechanism for inserting the baler twine longitudinally into the crease of the folded film. The roll of plastic film, an unwinding mechanism for the film and the baler twine inserting tube can be mounted on a tractor to facilitate the unwinding of the film and the insertion of the baler twine into the crease of the film.

The end section 16 of the film, about 8 inches in length, is placed within the channel 28 and the soil displaced by cutting the channel is compacted about the end section to form a fluid seal at the junction of the plastic film and the soil. The upper portion 12 of the plastic film is stapled about the crease to the stake about one-fourth inch from the top of the stake, with the staple overlying the crease and the baler twine longitudinally disposed within the crease. The lateral ends of the plastic film engage the peripheral earth levee forming the border of the rice field in fluid sealing relationship.

The synthetic levees are constructed along contour lines such that the water level 24 in the uphill side of the levee is generally two-tenths to three-tenths of a foot higher than the water level 25 in the adjacent compartment on the downhill side of the levee.

Thus, the objects of this invention have been accomplished, namely, a synthetic levee has been provided which is adapted to withstand the force exerted against it by a fluid under conditions in which the differential height of the fluid on opposite sides of the levee is substantial as is more particularly described hereinabove.

We claim:

1. A soil-supported, synthetic levee which comprises, in combination, a plurality of spaced elongated support members, each of said elongated support members having upper and lower portions, the lower portion of each elongated support member being disposed within and supported by the soil and the upper portion thereof extending upwardly above the soil, a substantially fluid-impervious pliant sheet material, said pliant sheet material folded longitudinally into two depending side portions to form a crease, a linear support member secured to the upper portion of each of said elongated support members, said linear support member being longitudinally disposed between said depending side portions of said pliant sheet material and engaging said crease so as to support said sheet material, and the lower edges of said two depending side portions of pliant sheet material engaging the soil from one elongated support member to another and held in fluid-sealing relationship therewith.

2. A soil-supported, synthetic levee which comprises, in combination, a plurality of spaced elongated rigid support members, each of said elongated support members having upper and lower portions, the lower portion of each of said elongated rigid support members disposed within and supported by the soil and the upper portion thereof extending upwardly above the soil, said elongated support members being horizontally aligned in a predetermined pattern, a substantially fluid-impervious pliant sheet material, said pliant sheet material folded longitudinally into two depending side portions to form a crease, a flexible linear support member secured to the upper portion of each of said elongated support members, said flexible linear support member being longitudinally disposed between said depending side portions and engaging said crease so as to support said sheet material, and the lower edges of said two depending side portions of pliant sheet material engaging the soil from one support member to another and held in fluid-sealing relationship therewith.

3. A soil-supported, synthetic levee which comprises, in combination, a plurality of spaced elongated support members, each of said elongated support members having upper and lower portions, the lower portion of each elongated support member disposed within and supported by the soil and the upper portion thereof extending substantially vertically above the soil and horizontally aligned in a predetermined pattern, a generally rectangularly shaped substantially fluid-impervious pliant sheet material, said fluid-impervious sheet material being folded longitudinally into two depending side portions so as to form a crease in the upper portion thereof, a flexible linear support member secured to the upper portion of said elongated support members, said linear support member longitudinally disposed between said depending side portions and engaging said crease so as to support said sheet material, means connecting said fluid-impervious sheet material to each of said elongated support members at a spaced locus above the soil, a channel within the soil, said channel in substantially uniform spaced relationship with respect to the horizontal alignment of said elongated support members, said depending portions extending downwardly from the locus of attachment on said elongated support members to the soil adjacent said elongated support members and overlying the soil intermediate said elongated support members and said channel, each of said depending side portions terminating in an end section, said end sections disposed within said channel and with the lower edges of said two depending side portions of pliant sheet material engaging the soil from one elongated support member to another and held in fluid-sealing relationship therewith.

4. A soil-supported, synthetic levee which comprises, in combination, a plurality of spaced stakes, each of said stakes having upper and lower portions, the lower portion of each stake being disposed within and supported by the soil and the upper portion thereof extending upwardly above the soil, said stakes being vertically disposed with respect to the soil and horizontally aligned in a predetermined pattern, a generally rectangularly shaped, substantially fluid-impervious pliant sheet material, said fluid-impervious sheet material being folded longitudinally into two depending side portions to form a crease, a flexible linear support member, said linear support member longitudinally disposed between said depending side portions and engaging said crease so as to support said sheet material, said fluid-impervious sheet material attached about the crease thereof to each stake at the upper portion thereof and at a spaced locus above the soil by a staple overlying said crease and embedded in each stake, a channel within the soil, said channel in substantially uniform spaced relationship with respect to the horizontal alignment of said stakes, said two depending side portions of said fluid-impervious sheet material extending downwardly from the locus of attachment on said stakes to the soil adjacent said stakes and overlying the soil intermediate said stakes and said channel, each of said depending side portions terminating in an end section, said end sections disposed within said channel and with the lower edges of said two depending side portions of pliant sheet material engaging the soil from one stake to another and held in fluid-sealing relationship therewith.

5. A soil-supported, synthetic levee which comprises, in combination, a plurality of spaced elongated stakes, each of said elongated stakes having upper and lower portions, the lower portion of each stake disposed within and supported by the soil and the upper portion thereof extending upwardly above the soil, said stakes being vertically disposed with respect to the soil and horizontally aligned in a predetermined pattern, a generally rectangularly shaped, substantially fluid-impervious flexible plastic film, said fluid-impervious plastic film folded longitudinally into two depending side portions to form a crease, a cord, said cord longitudinally disposed between said depending side portions and engaging said crease so as to support said fluid-impervious plastic film, said fluid-impervious plastic film attached about the crease thereof to each stake at the upper portion thereof and at a spaced locus above the soil by a staple overlying said crease and embedded in each stake, a channel within the soil, said channel in substantially uniform spaced relationship with respect to the horizontal alignment of said stakes, said two depending side portions of said fluid-impervious plastic film extending downwardly from the locus of attachment on said stakes to the soil adjacent said stakes and overlying the soil intermediate said stakes and said channel, each of said depending side portions terminating in an end section, said end sections disposed within said channel and with the lower edges of said two depending side portions of the fluid-impervious plastic film engaging the soil from one stake to another and held in fluid-sealing relationship therewith.

6. A soil-supported, synthetic levee which comprises, in combination, a plurality of spaced stakes, each of said stakes having upper and lower portions, the lower portion of each stake being disposed within and supported by the soil and the upper portion of each stake extending upwardly above the soil, said stakes being vertically disposed with respect to the soil and horizontally aligned in a predetermined pattern, a generally rectangularly shaped, substantially fluid-impervious flexible polyethylene film, said polyethylene film being folded longitudinally into two depending side portions to form a crease, a cord, said cord longitudinally disposed between said two depending side portions and engaging said crease so as to support said polyethylene film, said polyethylene film attached about the crease thereof to each stake at the upper portion thereof and at a spaced locus above the soil by a staple overlying said crease and embedded in each stake, a channel within the soil, said channel in substantially uniform spaced relationship with respect to the horizontal alignment of said stakes, said depending side portions extending downwardly free from the locus of attachment on said stakes to the soil adjacent said stakes and overlying the soil intermediate said stakes and said channel with the portion of said film overlying said soil perforated with small openings, each of said depending side portions terminating in an end section, said end sections disposed within said channel and soil compacted about said end sections in said channel whereby a fluid barrier is established.

7. An endless soil-supported, synthetic levee which comprises, in combination, a plurality of spaced stakes, said stakes having upper and lower portions, the lower portion of each stake disposed within and supported by the soil and the upper portion of each stake extending upwardly above the soil, said stakes being vertically disposed with respect to the soil and horizontally aligned in a predetermined pattern, an endless generally rectangularly shaped, substantially fluid-impervious flexible polyethylene film, said polyethylene film folded longitudinally into two depending side portions to form a crease, a cord, said cord longitudinally disposed between said depending side portions and engaging said crease, said polyethylene film attached about the crease thereof to each stake at a spaced locus above the soil by a staple overlying said crease and embedded in each stake, a channel within the soil, said channel in substantially uniform spaced relationship with respect to the horizontal alignment of said stakes, said depending portions extending downwardly from the locus of attachment on said stakes to the soil adjacent said stakes and overlying the soil intermediate said stakes and said channel with the portion of said film overlying said soil perforated with small openings, each of said depending portions terminating in an end section, said end sections disposed within said channel and soil compacted about said end sections in said channel whereby a fluid barrier is established.

References Cited by the Examiner

UNITED STATES PATENTS

| | | | |
|---|---|---|---|
| 535,153 | 3/1895 | Witcher | 61—29 |
| 625,860 | 5/1899 | Thornton | 61—12 |
| 1,215,057 | 2/1917 | Perkins | 61—12 |
| 1,381,427 | 6/1921 | Patrick | 61—12 X |
| 2,341,515 | 2/1944 | Rehfeld | 61—3 |
| 2,609,666 | 9/1952 | Mesnager | 61—30 |
| 2,636,353 | 4/1953 | Kanemoto | 61—29 |
| 3,067,585 | 12/1962 | Hait | 61—7 |
| 3,134,233 | 5/1964 | Morrison | 61—12 |

FOREIGN PATENTS

| | | |
|---|---|---|
| 1,746 | of 1900 | Austria. |
| 189,572 | 4/1957 | Austria. |
| 517,831 | 10/1955 | Canada. |
| 718,164 | 3/1942 | Germany. |

OTHER REFERENCES

Modern Plastic, page 83, September 1961.

EARL J. WITMER, *Primary Examiner.*

WILLIAM I. MUSHAKE, BENJAMIN BENDETT,
*Examiners.*